US 6,745,343 B1

United States Patent
Barenys et al.

(10) Patent No.: US 6,745,343 B1
(45) Date of Patent: Jun. 1, 2004

(54) APPARATUS AND METHOD FOR PERFORMING SURVEILLANCE PRIOR TO BOOT-UP OF AN OPERATING SYSTEM

(75) Inventors: Michael Anton Barenys, Austin, TX (US); Douglas Michael Boecker, Rochester, MN (US); Brent Ray DenHartog, Rochester, MN (US); Garth Wade Tschetter, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 662 days.

(21) Appl. No.: 09/615,769

(22) Filed: Jul. 13, 2000

(51) Int. Cl.$^7$ ................................. G06F 11/00
(52) U.S. Cl. .......................... 714/36; 714/57
(58) Field of Search .................. 714/36, 57, 51, 714/23; 713/2

(56) References Cited

U.S. PATENT DOCUMENTS

| | | | | |
|---|---|---|---|---|
| 6,035,420 A | * | 3/2000 | Liu et al. | 714/25 |
| 6,061,788 A | * | 5/2000 | Reynaud et al. | 713/2 |
| 6,381,694 B1 | * | 4/2002 | Yen | 713/2 |
| 6,401,218 B1 | * | 6/2002 | Linam et al. | 714/25 |
| 6,463,531 B1 | * | 10/2002 | Aguilar et al. | 713/2 |
| 6,502,208 B1 | * | 12/2002 | McLaughlin et al. | 714/25 |

* cited by examiner

*Primary Examiner*—Robert Beausoliel
*Assistant Examiner*—Christopher S. McCarthy
(74) *Attorney, Agent, or Firm*—Duke W. Yee; Mark E. McBurney; Wayne P. Bailey

(57) ABSTRACT

An apparatus and method for performing surveillance prior to boot-up of an operating system is provided. The apparatus and method include an error detector that monitors a boot-up sequence of a support system for the occurrence of an error. If an error is detected, a unit check signal is output by the error detector. The unit check signal is received by either the support system or an error message output device and a corresponding error message is generated and output for use by a user of the computing system.

6 Claims, 4 Drawing Sheets

APPARATUS AND METHOD FOR PERFORMING SURVEILLANCE PRIOR TO BOOT-UP OF AN OPERATING SYSTEM

BACKGROUND OF THE INVENTION

1. Technical Field

The present invention is directed to an apparatus and method for performing surveillance prior to boot-up of an operating system. More particularly, the present invention is directed to an apparatus and method for providing error detection and an error message display prior to an operating system being loaded.

2. Description of Related Art

Most computing systems use some sort of surveillance to help detect system problems during operation of the computing system. Surveillance is a communication system between the operating system, e.g. Advanced Interactive executive (AIX), and a support system, e.g. a service processor. With typical surveillance, both the operating system and the support system send "heartbeat" messages to each other on a periodic basis. If either does not receive the heartbeat message from the other within a given period of time, it assumes that the other component has failed. As a result, the failure will be logged in a corresponding error log indicating that a repair action is necessary.

This method is fairly effective, assuming both the operating system and the service processor are running. However, early during a boot-up process, the operating system of the computing system is not running. Therefore, there is no surveillance to detect a failure of the service processor.

Therefore, it would be beneficial to have an apparatus and method for performing surveillance prior to boot-up of an operating system. It would further be advantageous to have an apparatus and method for providing error detection and error message display for errors occurring prior to boot-up of an operating system.

SUMMARY OF THE INVENTION

The present invention provides an apparatus and method for performing surveillance prior to boot-up of an operating system. The apparatus and method include an error detector that monitors a boot-up sequence of a support system for the occurrence of an error. If an error is detected, a unit check signal is output by the error detector. The unit check signal is received by either the support system or an error message output device and a corresponding error message is generated and output for use by a user of the computing system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
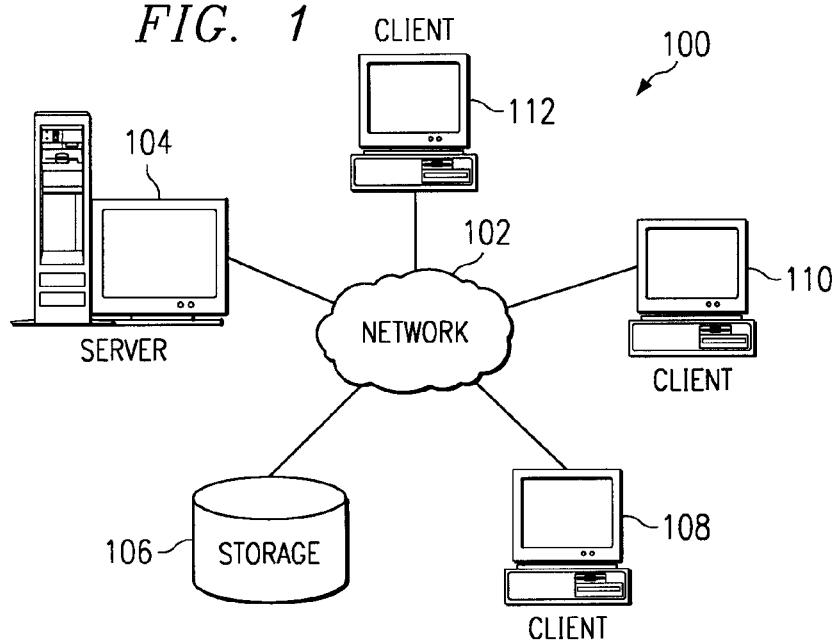
FIG. 1 is an exemplary block diagram of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown.

In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages.

Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
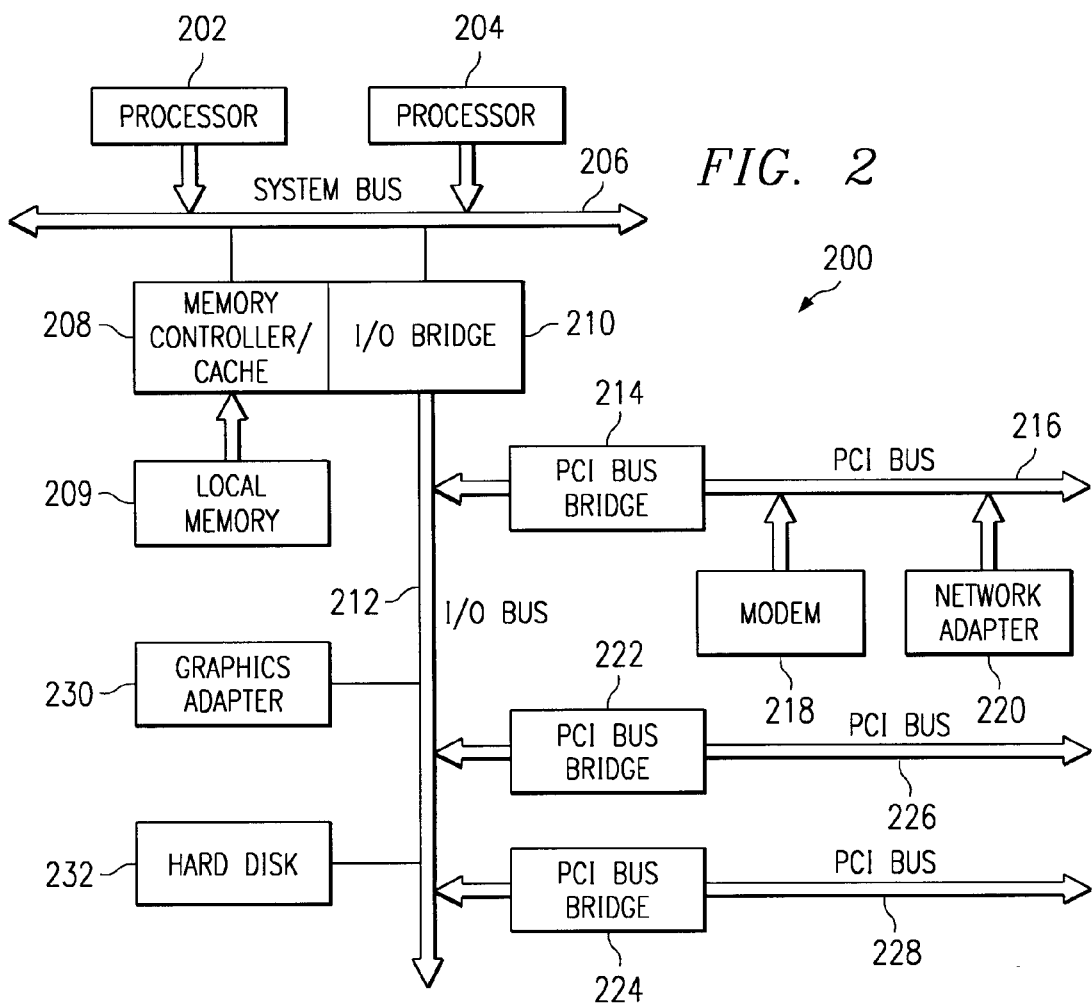
FIG. 2 is an exemplary block diagram of server in which the present invention may be implemented.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212.

Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
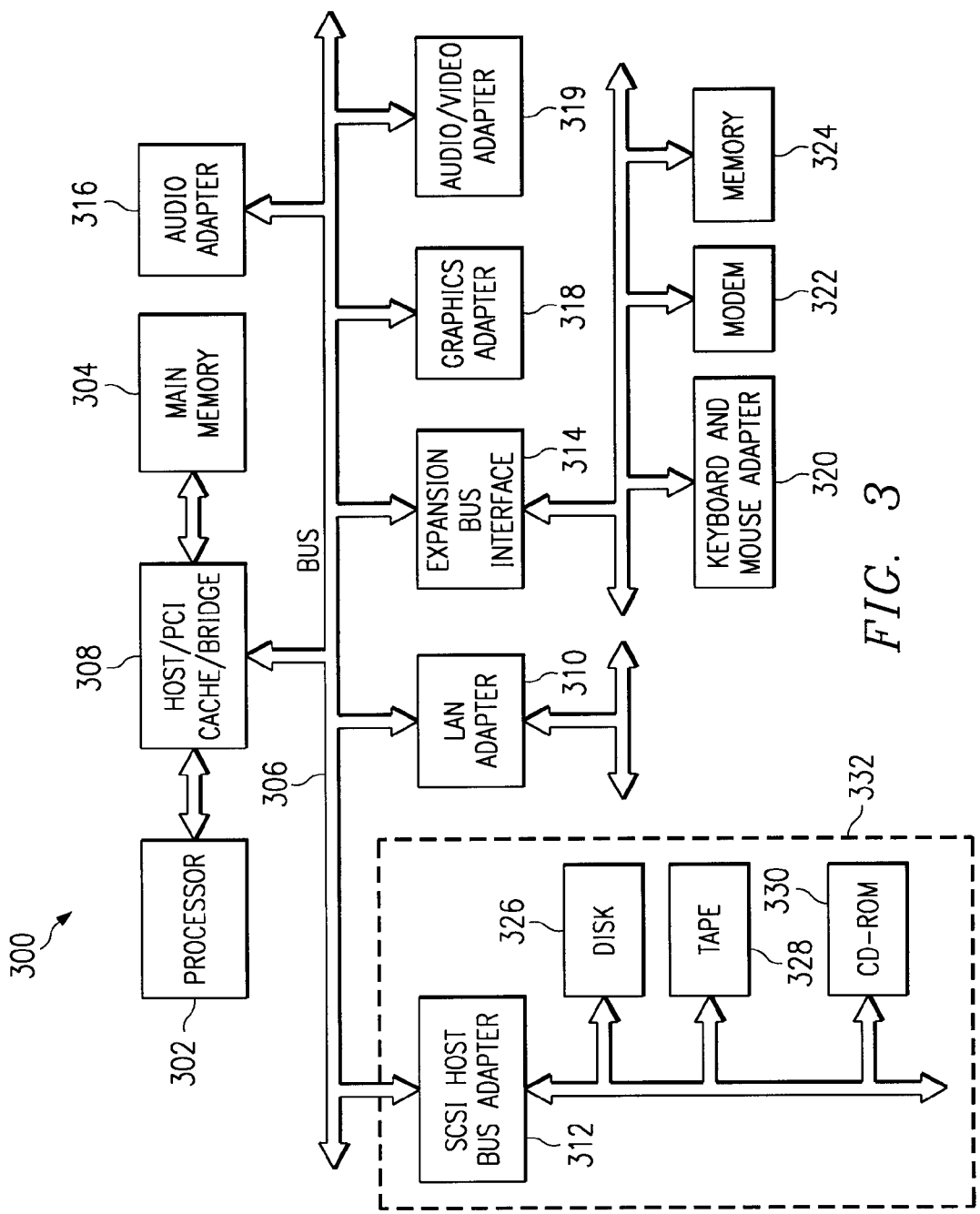
FIG. 3 is an exemplary block diagram of a client device in which the present invention may be implemented.

With reference now to FIG. 3, a block diagram illustrating a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards.

In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide nonvolatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides an apparatus and method for performing error detection prior to an operating system being loaded. The apparatus and method of the present invention may be implemented in any type of computing device including server 200, client device 300, and the like. For purposes of the following description, it will be assumed that the apparatus and operating system of the present invention are implemented in a server, such as server 200.

Figure 4A:
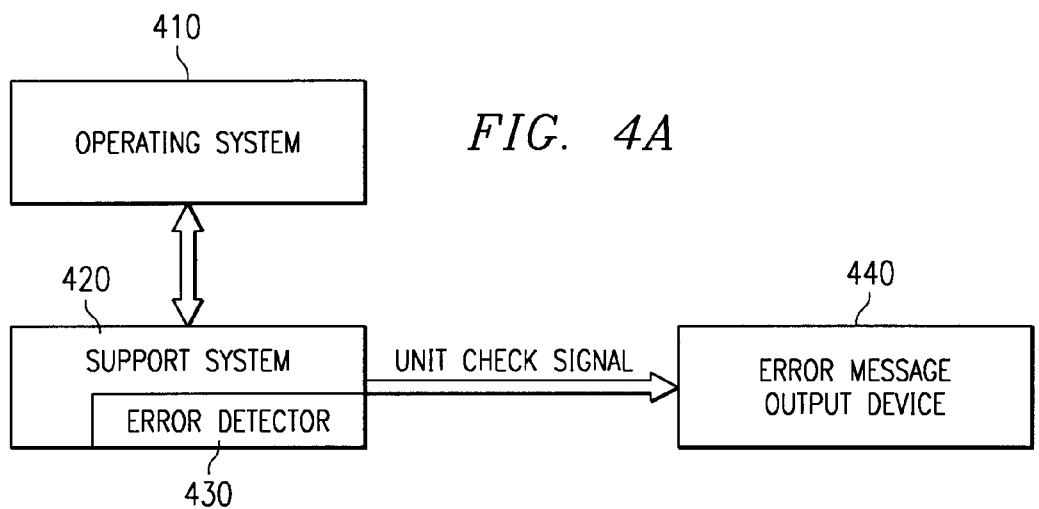
FIG. 4A is an exemplary block diagram illustrating the primary elements of the present invention in accordance with a first embodiment.

FIG. 4A is an exemplary block diagram of the primary elements of a first embodiment of the present invention. As shown in FIG. 4A, the present invention includes an operating system 410, a support system 420, an error detector 430, and a error message output device 440. These elements may be implemented as hardware and/or software on a computing system in accordance with the present invention. For example, these elements may be implemented as hardware elements or software in either of the server 200 or the client device 300 of FIGS. 2 and 3, respectively.

The operating system 410 may be any type of operating system generally known to those of ordinary skill in the art. For example, the operating system 410 may be Advanced Interactive eXecutive (AIX), UNIX, Windows NT, or the like.

The support system 420, may be any type of support system generally used in a computing system. For example, the support system 420 may be a service processor, a BIOS (built-in operating system), a control workstation, and the like. In a preferred embodiment of the present invention, the support system 420 is a service processor.

The error detector 430 may be any type of error detection device that is capable of detecting an error in the operation of the support system. For example, the error detector 430 may be a a watchdog timer, an error anti detection circuit, error detecting software/subroutines, and the like. In a preferred embodiment of the present invention, the error detector 430 is a watchdog timer that monitors the operation of the support system during a boot-up sequence.

As is generally known in the art, a watchdog timer operates by monitoring a timer every time the support system enters an operational loop, such as a subroutine in a computer program, or the like. If the watchdog timer has not been reset, by exiting the loop, within a predetermined period of time, the watchdog timer is tripped and an error message is generated.

In the present invention, the watchdog timer monitors the operation of the support system and if an error is encountered, outputs a unit check signal. The unit check signal is a signal that points to the service processor as the source of a system fault. The unit check signal may be used to generate an error output message on the error message output device 440 for informing a user of the source of a system fault.

The error message output device 440 may be any type of output device capable of outputting an error output message. For example, the error message output device 440 may be a visual display, an audio speaker and/or a combination of visual display and audio speaker. Furthermore, the visual display may be any type of visual display used to display information, such as an error output message. For example, the error message output device 440 may be an operator panel, a computer monitor, a personal digital assistant (PDA), a liquid crystal display (LCD), a cathode ray tube (CRT), or the like. In a preferred embodiment, the display 440 is an operator panel.

As described above, early in a boot-up sequence, the operating system 410 is not yet being executed. During this period of time, there is no surveillance should an error in the support system 420 occur. As a result, erroneous repairs may be made in an attempt to solve a system failure. The present invention provides a solution to this problem by having an error detector 430 associated with the support system 420 monitor the support system during this initial period of time during the boot sequence.

In operation, the error detector 430 monitors the boot-up sequence performed by the support system 420 for the occurrence of any errors in the execution of the boot-up sequence. This may be done, for example, by setting a watchdog timer when the support system 420 enters operational loops and resetting the watchdog timer when the support system 420 exits from the operational loop. If an error occurs, e.g., the watchdog timer is not reset within a predetermined period of time, the error detector 430 outputs a unit check signal to the error message output device 440.

The error message output device 440, upon receiving the unit check signal from the error detector 430, generates an error output message which is output by the error message output device 440. This error output message may be a visually displayed message, an audio message, or a combination of visual display and audio message. The audio message may be as simple as a beep sound or as complicated as a synthesized speech audio output, as is generally known in the art.

The error output message output by the error message output device 440 may be used by a user to identify the support system 420 as the source of an error during an early stage of the boot-up sequence. In this way, an additional level of surveillance is provided during a period of time in which the prior art systems do not provide any surveillance.

In the embodiment shown in FIG. 4A, the error detector 430 outputs a unit check signal to the error message output device 440 such that the error message output device 440 generates an error output message that is output based on the receipt of the unit check signal. This embodiment is termed the "active" error message output device embodiment because the error message output device 440 must identify that a unit check signal has been received and generate an appropriate error output message.

Figure 4B:
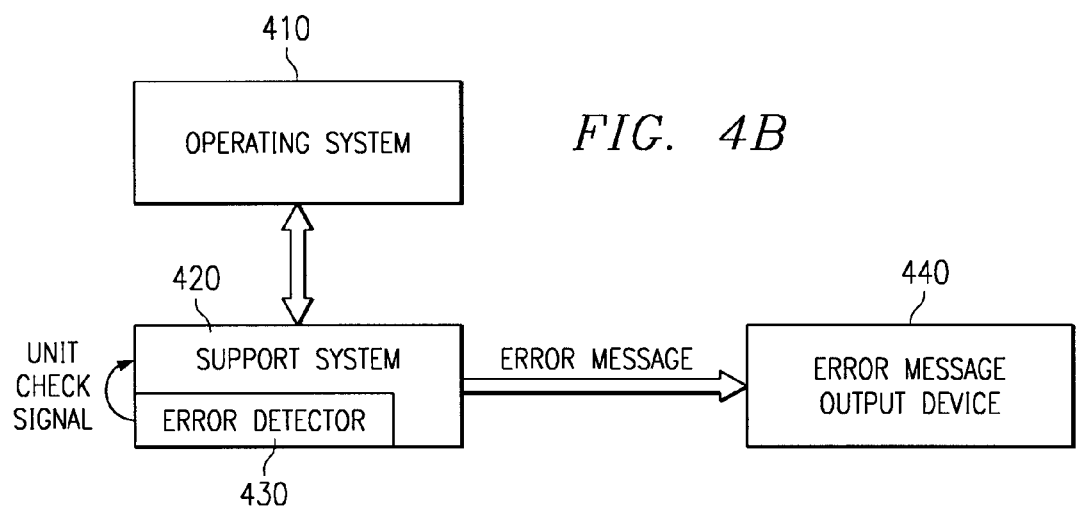
FIG. 4B is an exemplary block diagram illustrating the primary elements of the present invention in accordance with a second embodiment.

FIG. 4B is an exemplary block diagram illustrating an alternative embodiment of the present invention. The embodiment shown in FIG. 4B is termed the "passive" error message output device embodiment because the error message output device 440 need only output the receive error message without having to generate the error output message.

In the embodiment shown in FIG. 4B, when the error detector 430 detects the occurrence of an error in the execution of the boot-up sequence, the error detector 430 outputs a unit check signal to the support system 420. The support system 420 then generates an appropriate error message to identify the support system as the source of an error. The error message is then output by the error message output device 440 without requiring any further processing other than that necessary to output the error message.

Figure 5:
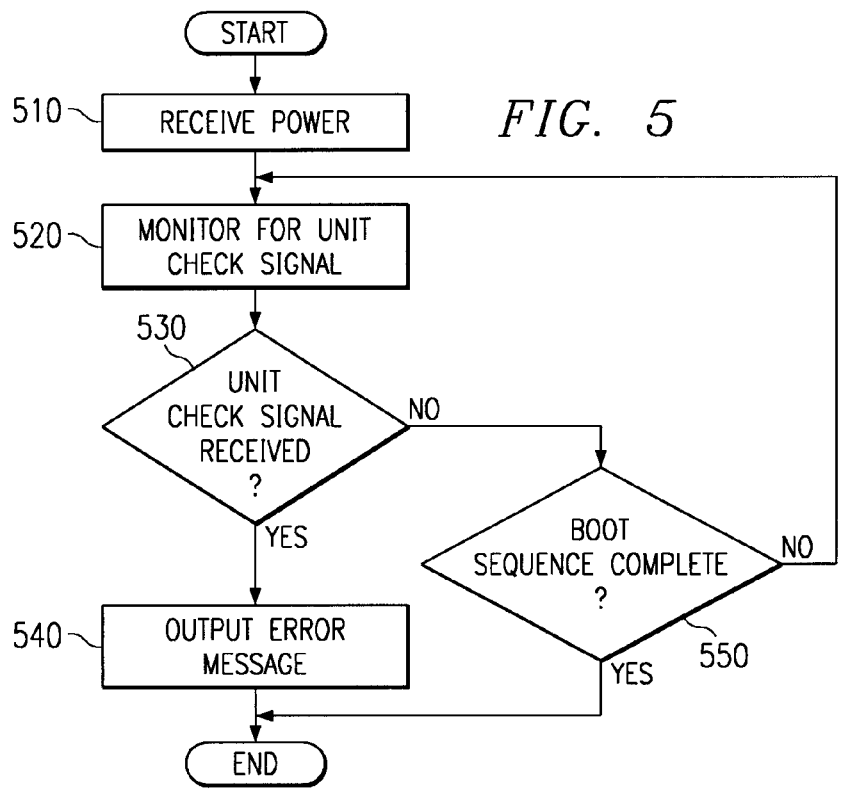
FIG. 5 is a flowchart outlining an exemplary operation of an active display device in accordance with the present invention.

FIG. 5 is a flowchart outlining an exemplary operation of the error message output device 440 in accordance with the embodiment shown in FIG. 4A. In the embodiment shown in FIG. 4B, the operation outlined in FIG. 5 will be performed by the support system 420.

As shown in FIG. 5, the operation begins by power being received by the error message output device (step 510). The error message output device then monitors for the receipt of a unit check signal (step 520). If a unit check signal is received (step 530:YES), an error message is output (step 540).

If a unit check signal is not received (step 530:NO), a determination is made as to whether the boot sequence has been completed (step 550). If so, the operation ends. If not, the operation returns to step 520 and continues to monitor for a unit check signal.

Figure 6:
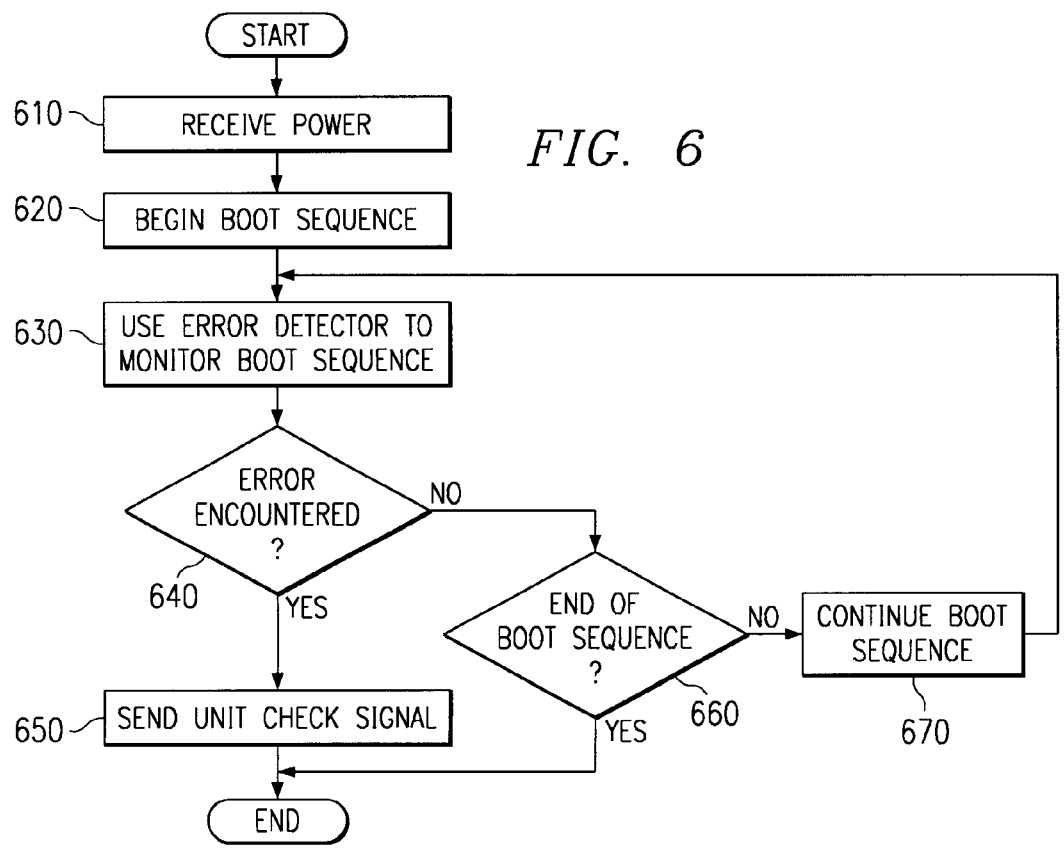
FIG. 6 is a flowchart outlining an exemplary operation of the service processor in accordance with the present invention.

FIG. 6 is a flowchart outlining an exemplary operation of the support system 420 in accordance with the embodiment shown in FIG. 4A. As noted above, the operation of FIGS. 5 and 6 may both be implemented in the support system 420 should the embodiment in FIG. 4B be utilized.

As shown in FIG. 6, the operation starts with power being received by the support system (step 610). Thereafter, the boot sequence is initiated. An error detector is then used to monitor the execution of the boot sequence (step 630). If an error is encountered (step 640:YES), the error detector outputs a unit check signal (step 650). If an error is not encountered (step 640:NO), a determination is made as to whether the boot sequence has completed (step 660). If so, the operation ends. If not, the boot sequence is continued (step 670) and the operation returns to step 630.

Thus, the present invention provides a mechanism by which surveillance is provided during a period in which the operating system of a computing system is not yet running. The present invention provides an error detector which detects the occurrence of an error in the operation of a support system during an early period in the boot-up sequence of a computing system. Furthermore, the present invention provides a mechanism for outputting an error message identifying the support system as the source of an error during an early period in the boot-up sequence.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of performing surveillance in a computing system, comprising:

prior to an operating system being run by at least one processor within the computing system, detecting an error in an operation of the computing system; and outputting an error message identifying the source of the error, wherein detecting an error in the operation of the computing system includes monitoring a boot-up sequence performed by a support system for the occurrence of an error in the boot-up sequence, wherein the support system is at least one of a service processor and a control workstation and is used to monitor for errors in the operation of the computing system.

2. A method of performing surveillance in a computing system, comprising:

prior to an operating system being run by at least one processor within the computing system, detecting an error in an operation of the computing system; and outputting an error message identifying the source of the error, wherein outputting an error message identifying the source of the error includes:

outputting a signal from an error detector if an error is detected;

receiving the signal at a support system, wherein the support system is at least one of a service processor and a control workstation;

generating, in the support system, the error message based on the signal; and outputting the error message to an error message output device.

3. A computer program product in a computer readable medium for performing surveillance in a computing system, comprising:

first instructions for detecting an error in an operation of the computing system prior to an operating system being nm by at least one processor within the computing system; and second instructions for outputting an error message identifying the source of the error, wherein the first instructions for detecting an error in the operation of the computing system include instructions for monitoring a boot-up sequence performed by a support system for the occurrence of an error in the boot-up sequence, wherein the support system is at least one of a service processor and a control workstation and is used to monitor for errors in the operation of the computing system.

4. A computer program product in a computer readable medium for performing surveillance in a computing system, comprising:

first instructions for detecting an error in an operation of the computing system poor to an operating system being run by at least one processor within the computing system; and second instructions for outputting an error message identifying the source of the error, wherein the second instructions for outputting an error message identifying the source of the error include:

instructions for outputting a signal from an error detector if an error is detected;

instructions for receiving the signal at a support system, wherein the support system is at least one of a service processor and a control workstation;

instructions for generating, in the support system, the error message based on the signal; and instructions for outputting the error message to an error message output device.

5. An apparatus for performing surveillance in a computing system, comprising:

an error message output device; and an error detector coupled to the error message output device, wherein the error detector detects an error in an operation of the computing system prior to an operating system being run by at least one processor within the computing system, and the error message output device outputs an error message identifying the source of the error based on the detection of the error by the error detector, wherein the error detector detects an error in the operation of the computing system by monitoring a boot-up sequence performed by a support system for the occurrence of an error in the boot-up sequence, wherein the support system is at least one of a service processor and a control workstation and is used to monitor for errors in the operation of the computing system.

6. An apparatus for performing surveillance in a computing system, comprising:

an error message output device; and an error detector coupled to the error message output device, wherein the error detector detects an error in an operation of the computing system prior to an operating system being run by at least one processor within the computing system, and the error message output device outputs an error message identifying the source of the error based on the detection of the error by the error detector, wherein the error detector outputs a signal to a support system if an error is detected, wherein the support system is at least one of a service processor and a control workstation, the support system generates the error message based on the signal, and the error message output device outputs the error message.

\* \* \* \* \*

UNITED STATES PATENT AND TRADEMARK OFFICE
CERTIFICATE OF CORRECTION

| | | |
|---|---|---|
| PATENT NO. | : 6,745,343 B1 | Page 1 of 1 |
| APPLICATION NO. | : 09/615769 | |
| DATED | : June 1, 2004 | |
| INVENTOR(S) | : Barenys et al. | |

It is certified that error appears in the above-identified patent and that said Letters Patent is hereby corrected as shown below:

Col. 7, line 66: after "being" delete "nm" and insert --run--.

Col. 8, line 15: after "computing system" delete "poor" and insert --prior--.

Signed and Sealed this

First Day of May, 2007

JON W. DUDAS
*Director of the United States Patent and Trademark Office*